(12) United States Patent
Koishi

(10) Patent No.: US 11,028,769 B2
(45) Date of Patent: Jun. 8, 2021

(54) RESTART STANDBY CONTROL METHOD AND RESTART STANDBY CONTROL DEVICE FOR INTERNAL-COMBUSTION ENGINE

(71) Applicant: Nissan Motor Co., Ltd., Kanagawa (JP)

(72) Inventor: Akifumi Koishi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/646,377

(22) PCT Filed: Sep. 12, 2017

(86) PCT No.: PCT/JP2017/032744
§ 371 (c)(1),
(2) Date: Mar. 11, 2020

(87) PCT Pub. No.: WO2019/053762
PCT Pub. Date: Mar. 21, 2019

(65) Prior Publication Data
US 2020/0271053 A1  Aug. 27, 2020

(51) Int. Cl.
*F02B 67/06* (2006.01)
*F02N 11/04* (2006.01)
(Continued)

(52) U.S. Cl.
CPC ............ *F02B 67/06* (2013.01); *F02N 11/04* (2013.01); *F02N 11/0814* (2013.01);
(Continued)

(58) Field of Classification Search
CPC .. F01L 1/02; F01L 1/024; F02N 11/04; F02N 11/0814; F02N 2200/022;
(Continued)

(56) References Cited

U.S. PATENT DOCUMENTS

| 2004/0084008 A1* | 5/2004 | Serkh | F16H 7/1227 |
| | | | 123/198 R |
| 2010/0065001 A1* | 3/2010 | Spicer | F02N 15/022 |
| | | | 123/179.28 |

(Continued)

FOREIGN PATENT DOCUMENTS

| DE | 102010024203 A1 | 12/2011 |
| JP | 2006299844 A | 11/2006 |

(Continued)

OTHER PUBLICATIONS

DE 102010024203, Gombert, Dec. 2011, machine translation.*
Extended European Search Report issued in European Application No. 17925237.4, dated Aug. 11, 2020 (7 pages).

*Primary Examiner* — Phutthiwat Wongwian
*Assistant Examiner* — Diem T Tran
(74) *Attorney, Agent, or Firm* — Osha Bergman Watanabe & Burton LLP

(57) ABSTRACT

An internal-combustion engine includes a belt-driven starter generator and makes an idling stop while a vehicle is at a stop. In the process of the engine revolution speed decreasing with cutting of fuel to stop the vehicle, to suppress the reduction in restart responsiveness caused by slack in a belt, preliminary powering of the starter generator is performed. The belt tension during deceleration microscopically changes periodically between a relatively high-tension period and a relatively low-tension period due to pulsation of the engine revolution speed. Slack in the belt does not occur in the high tension period, and thus preliminary powering torque is applied only in the low-tension period.

9 Claims, 6 Drawing Sheets

(51) Int. Cl.
  *F02N 11/08*  (2006.01)
  *F16H 7/12*  (2006.01)
  *F16H 7/08*  (2006.01)
(52) U.S. Cl.
  CPC . *F02N 2011/0896* (2013.01); *F02N 2200/022* (2013.01); *F16H 7/12* (2013.01); *F16H 2007/0885* (2013.01)
(58) Field of Classification Search
  CPC .. F02N 2011/0896; F02N 11/00; F02N 11/08; F02N 11/0844; F02N 11/0855; F02N 15/08; F02N 19/00; F02N 2200/041; F02N 2300/104; F02B 67/06; F16H 7/12; F16H 2007/0885; F16H 2007/081; F16H 2007/0865; F16H 2007/0874; F16H 2007/0893; F16H 2007/0897; F16H 7/08; F16H 7/1254; F02D 2250/24; F02D 45/00; Y02T 10/40
  See application file for complete search history.

(56) References Cited

U.S. PATENT DOCUMENTS

| | | | |
|---|---|---|---|
| 2014/0130635 A1* | 5/2014 | Kees | F16H 7/08 74/7 R |
| 2015/0144099 A1* | 5/2015 | Straker | F02N 11/04 123/339.14 |
| 2015/0167797 A1 | 6/2015 | Noguchi et al. | |
| 2015/0260264 A1* | 9/2015 | Petridis | F16H 7/08 474/110 |
| 2016/0065107 A1 | 3/2016 | Klein et al. | |

FOREIGN PATENT DOCUMENTS

| | | |
|---|---|---|
| JP | 2015135106 A | 7/2015 |
| JP | 5986617 B2 | 9/2016 |

\* cited by examiner (a) STEADY  (b) ACCELERATION: NEGATIVE  (c) ACCELERATION: POSITIVE

RESTART STANDBY CONTROL METHOD AND RESTART STANDBY CONTROL DEVICE FOR INTERNAL-COMBUSTION ENGINE

TECHNICAL FIELD

The present invention relates to an internal-combustion engine that is restarted by a motor generator connected with a crankshaft via a belt transmission mechanism and, particularly, to a restart standby control method and a restart standby control device that perform preliminary powering of the motor generator in preparation for restart of the internal-combustion engine when the engine revolution speed decreases with cutting of fuel to the internal-combustion engine to stop a vehicle.

BACKGROUND ART

There is known so-called idling stop technology of shutting down an internal-combustion engine while a vehicle is at a stop to improve fuel consumption of the internal-combustion engine; furthermore, there is also known technology for improving fuel consumption by cutting fuel at an earlier stage, i.e., while a vehicle is slowing down to come to a stop. In the process of the engine revolution speed and the vehicle speed decreasing in a state where the internal-combustion engine has stopped firing, when a driver presses the accelerator pedal to speed up again, in a case where the engine revolution speed has decreased to or below a certain limit (a self-restorable revolution speed), it is necessary to restart the internal-combustion engine by a motor generator or the like applying starting torque to the internal-combustion engine.

Patent Literature 1 has disclosed standby control that in a structure with a motor generator connected via a belt transmission mechanism, to increase the start responsiveness upon request for restart of an internal-combustion engine while a vehicle is running, the motor generator is powered (i.e., preliminarily powered) with relatively low torque after an internal-combustion engine has stopped firing, and thus slack in a belt is removed.

That is, depending on a torque transmitting direction, one side of an endless belt wound around a crankshaft pulley and a pulley of the motor generator becomes the tight side, and the other side becomes the loose side; however, while the motor generator is rotated by a crankshaft in the process of the vehicle being slowing down as described above, a section (a section to be on the upstream side of the pulley of the motor generator in a belt moving direction) that is to be the tight side when the internal-combustion engine is started by the motor generator becomes the loose side, and there may be belt slack in this section. Accordingly, even if the motor generator starts a powering operation in response to a restart request, starting torque is not transmitted to the crankshaft pulley until the belt slack becomes zero, and the belt tension increases, and thus it takes longer to start the internal-combustion engine. Furthermore, the belt tension rapidly increases at a point of time when the slack has become zero; therefore, the maximum tension becomes high, which causes deterioration of the belt.

In Patent Literature 1, the motor generator is preliminarily powered regardless of whether or not a restart request is actually issued, and thereby slack in the belt is removed.

However, in such conventional standby control in which preliminary powering torque is applied to the internal-combustion engine by the motor generator while the vehicle is slowing down, the powering torque is applied to the internal-combustion engine in a situation of originally trying to shut down the internal-combustion engine, and thus the rate of decrease in engine revolution speed is reduced, which increases the length of time the engine revolution speed remains at a resonance point (a frequency band at which a powertrain system of the vehicle resonates) that generally exists below an idling speed, and deteriorates noise and vibration characteristics. Furthermore, time until the internal-combustion engine is completely shut down is prolonged, and when the powering torque is excessively high, the internal-combustion engine is not shut down. Moreover, when restart of the internal-combustion engine is not performed, energy consumed for the preliminary powering goes to waste.

CITATION LIST

Patent Literature

Patent Literature 1: Japanese Patent No. 5986617

SUMMARY OF INVENTION

A restart standby control method for an internal-combustion engine according to the present invention includes: performing preliminary powering to suppress slack in a belt between a crankshaft and a motor generator in preparation for restart of the internal-combustion engine when an engine revolution speed decreases with cutting of fuel to the internal-combustion engine to stop a vehicle; and while belt tension periodically changes between a high-tension period in which tension is relatively high and a low-tension period in which tension is relatively low, controlling this preliminary powering to cause preliminary powering torque in the low-tension period to be higher than preliminary powering torque in the high-tension period.

For example, the preliminary powering is performed only in the low-tension period, and no preliminary powering torque is applied in the high-tension period.

In a situation where the engine revolution speed decreases with cutting of fuel to the internal-combustion engine, when the engine revolution speed, i.e., a rotation speed of the crankshaft is seen microscopically, the rotation speed pulsates/changes up and down and gradually decreases as a whole. Therefore, tension of an endless belt wound around a crankshaft pulley and a pulley of the motor generator (specifically, tension in a section on the upstream side of the pulley of the motor generator), as fundamental belt tension that does not take the preliminary powering into consideration, also involves periodic pulsation/change. That is, there exist the high-tension period in which the belt tension is relatively high and the low-tension period in which the belt tension is relatively low, and the belt tension periodically changes. In the high-tension period here, the belt is under positive tension; therefore, in this the high-tension period, slack in the belt does not occur even if no preliminary powering torque is applied.

In this invention, preliminary powering torque is applied only in the low-tension period, or higher preliminary powering torque than that is in the high-tension period is applied in the low-tension period, and thereby unnecessary application of preliminary powering torque in the high-tension period is suppressed.

Accordingly, it is possible to suppress disadvantages associated with the application of preliminary powering torque, i.e., increase in the length of time the engine revolution speed remains at a resonance point, increase in time until the internal-combustion engine is shut down, wasted energy consumption, etc. while maintaining advantages due to the application of preliminary powering torque, such as improvement in the start responsiveness when restart is requested and suppression of the maximum tension.

DESCRIPTION OF EMBODIMENTS

In the following, some embodiments of the present invention will be described in detail on the basis of drawings.

Figure 1:
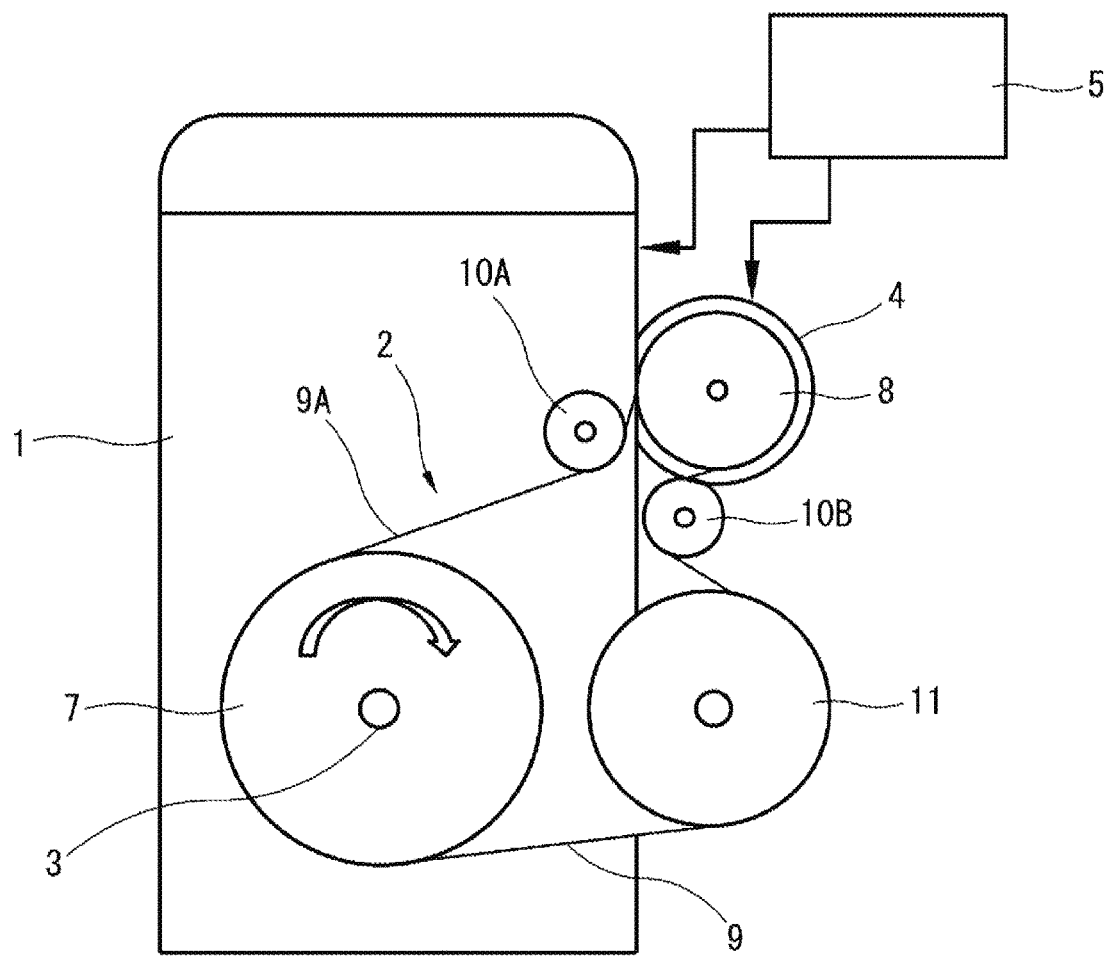
FIG. 1 is a configuration explanatory diagram showing an internal-combustion engine and a motor generator in an embodiment of the present invention.

FIG. 1 shows a configuration of an embodiment of the present invention. An internal-combustion engine 1 installed in a vehicle includes a gasoline engine or a diesel engine, and is configured to transmit power to a driving wheel (not shown) of the vehicle through a power control mechanism, such as a suitable stepped or stepless transmission mechanism and a clutch. To allow for cranking (i.e., restart) of the internal-combustion engine 1 before it completely stops rotating, the internal-combustion engine 1 includes a motor generator connected with a crankshaft 3 through a belt transmission mechanism 2, namely, a belt-driven starter generator (so-called BSG) 4. This starter generator 4 is controlled to perform both powering and regeneration by a controller 5, and electric power generated through the regeneration is stored in a battery (not shown).

The belt transmission mechanism 2 includes a crankshaft pulley 7 attached to the tip of the crankshaft 3, a motor pulley 8 provided on a rotating shaft of the starter generator 4, an endless belt 9 wound around these pulleys, and one or more tensioners 10 (10A and 10B) for adjusting the tension of this belt 9. In an example shown in the drawing, the belt transmission mechanism 2 drives an auxiliary machine 11, such as a compressor for an air conditioner or an oil pump, at the same time. It is to be noted that a configuration in which multiple auxiliary machines 11 exist is also possible; furthermore, the belt transmission mechanism 2 may be used exclusively for the starter generator 4 not including any auxiliary machine 11.

In the example shown in the drawing, the tensioners 10 (10A and 10B) are disposed between the crankshaft 3 and the starter generator 4 and between the starter generator 4 and the auxiliary machine 11. Although details are not shown, the tensioners 10 include a tensioner pulley in contact with an outer circumferential surface of the belt 9 and a biasing mechanism, including a spring, a hydraulic mechanism, etc., that biases this tensioner pulley toward the inner circumferential side of a belt moving path.

In FIG. 1, the internal-combustion engine 1, i.e., the crankshaft pulley 7 rotates in a clockwise direction, and therefore the starter generator 4 and the auxiliary machine 11 also rotate in the clockwise direction. Therefore, as for the restart responsiveness to cranking of the starter generator 4, belt slack in a section 9A of the belt path becomes a problem. The section 9A is a section on the upstream side of the starter generator 4 in a belt moving direction, i.e., a section between the crankshaft pulley 7 and the motor pulley 8 where the tensioner 10A is disposed. In the following description, unless otherwise described, "belt tension" means the belt tension in the section 9A.

It is to be noted that besides the starter generator 4, the internal-combustion engine 1 may be equipped with a starter motor for performing initial start-up (cranking) when a key to the vehicle is turned ON. Alternatively, the internal-combustion engine 1 may be configured to use the starter generator 4 to crank up the engine in a vehicle stop state for initial start-up.

Fuel supply to the internal-combustion engine 1 is controlled by the controller 5, and when the vehicle comes to a stop at an intersection or somewhere, shutdown of the internal-combustion engine 1, what is called an idling stop is made. Furthermore, prior to this idling stop, for example, when a driver has released the accelerator pedal while the vehicle is running, or when the driver has released the accelerator pedal and pressed the brake pedal, fuel is cut until the vehicle comes to a stop, i.e., until the rotation of the internal-combustion engine 1 is stopped, provided that other conditions, such as the vehicle speed, are met. That is, the engine revolution speed decreases with cutting of fuel to the internal-combustion engine 1 to stop the vehicle, and after the vehicle comes to a stop, it directly makes the transition to an idling stop. Various detection signals, such as an engine revolution speed signal, a vehicle speed signal, an accelerator position signal, a brake switch signal indicating depression of the brake pedal, a cooling water temperature signal, and an SOC signal indicating a state of battery charge, are input to the controller 5 from various sensors. It is to be noted that one controller 5 may be configured to control both the starter generator 4 and the internal-combustion engine 1, or a controller for the starter generator 4 and a controller for the internal-combustion engine 1 may be configured to give and receive a signal via an in-vehicle network.

In a situation where the engine revolution speed decreases with cutting of fuel to the internal-combustion engine 1 to stop the vehicle prior to an idling stop as described above, when there is no change in the driver's operation, the vehicle comes to a stop, and the internal-combustion engine 1 comes to stop rotating and makes the transition to an idling stop as described above. However, in a case where in the process of the vehicle speed and the engine revolution speed decreasing to stop the vehicle, the driver has changed his intention, as it is called a "change of mind", and pressed the accelerator pedal to speed up again, it is necessary to restart the internal-combustion engine 1 immediately. Especially, in a case where the engine revolution speed has decreased to or below a self-restorable revolution speed, the starter generator 4 applies starting torque to the crank shaft 3 of internal-combustion engine 1 to crank up the engine, and thereby the internal-combustion engine 1 is restarted.

Therefore, in a certain situation where the engine revolution speed decreases with cutting of fuel to the internal-combustion engine 1 to stop the vehicle as described above, restart standby control is performed in preparation for a restart request.

Figure 4:
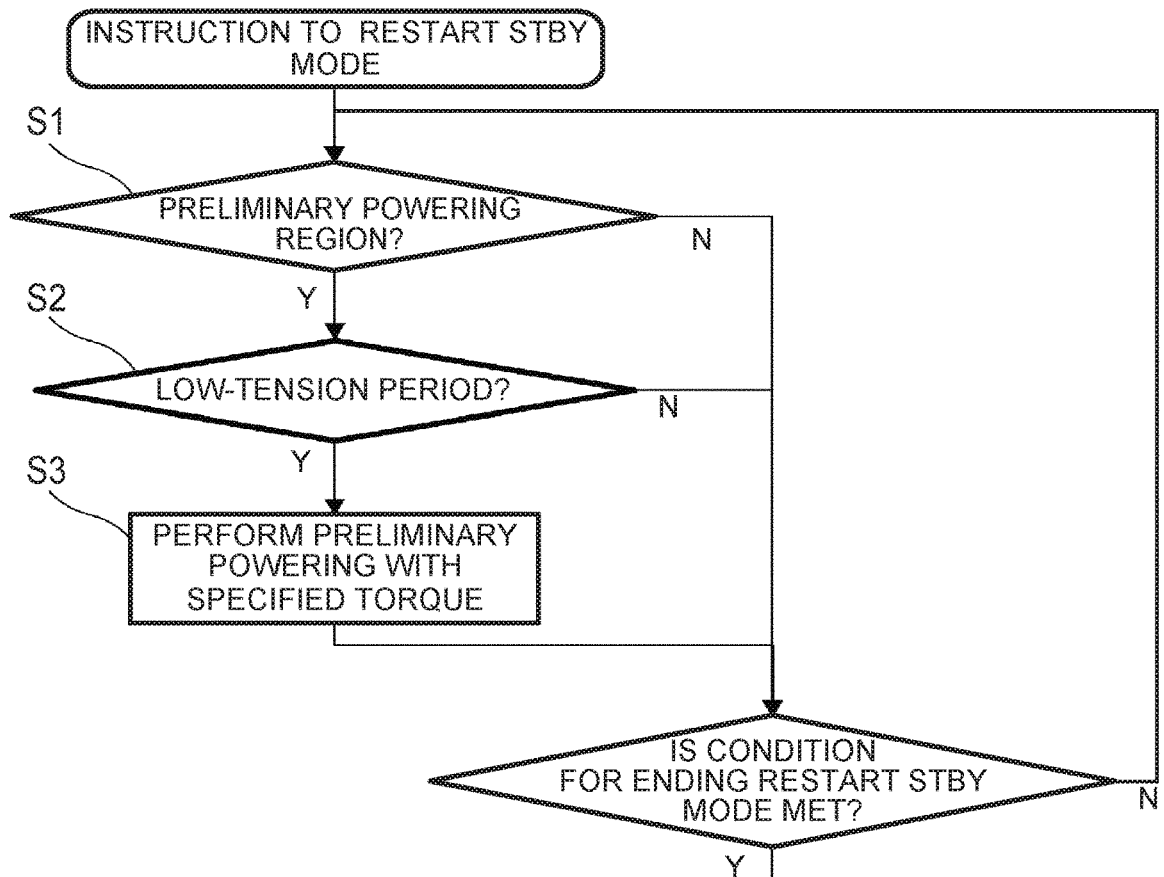
FIG. 4 is a flowchart showing the flow of restart standby control processing.

FIG. 4 is a flowchart showing the flow of restart standby control processing performed by the controller 5. The controller 5 is programmed to perform this restart standby control processing. For example, in accordance with a predetermined condition, such as the driver having released the accelerator pedal while the vehicle is running or the driver having released the accelerator pedal and pressed the brake pedal, when the vehicle is caused to freewheel with fuel cut, a routine shown in FIG. 4 as restart standby mode starts. At Step S1, the controller 5 determines whether or not the engine revolution speed is in a region in which preliminary powering is to be performed in preparation for restart. For example, when it is a revolution speed that allows the engine to be restored to self-sustaining operation simply by resumption of fuel supply, there is no need to perform preliminary powering when it has decreased to or below the self-restorable revolution speed, the processing moves from Step S1 on to Step S2, the controller 5 determines whether the periodically varying belt tension to be described later is in a low-tension period (a belt loosening period) in which the belt tension is relatively low. When the belt tension is in the low-tension period, the processing moves on to Step S3, the starter generator 4 is powered with specified torque. That is, when it is in the low-tension period, preliminary powering torque is applied to the internal-combustion engine 1 by the starter generator 4.

The processing moves from Step S3 on to Step S4, the controller 5 determines whether or not any condition for ending the restart standby mode is met. As a condition for ending, either stopping of the rotation of the internal-combustion engine 1 or a request for restart has been detected, the restart standby mode is ended. Until any condition for ending is met, the processes at Steps S1 to S3 are repeated. Therefore, after the vehicle is caused to freewheel, and thus the engine revolution speed has decreased to the region in which preliminary powering is to be performed, preliminary powering is performed only in the low-tension period in which the periodically varying belt tension is relatively low, and preliminary powering is stopped in a high-tension period in which the belt tension is relatively high. That is, preliminary powering is intermittently performed according to variation in the periodically varying belt tension.

Figure 3:
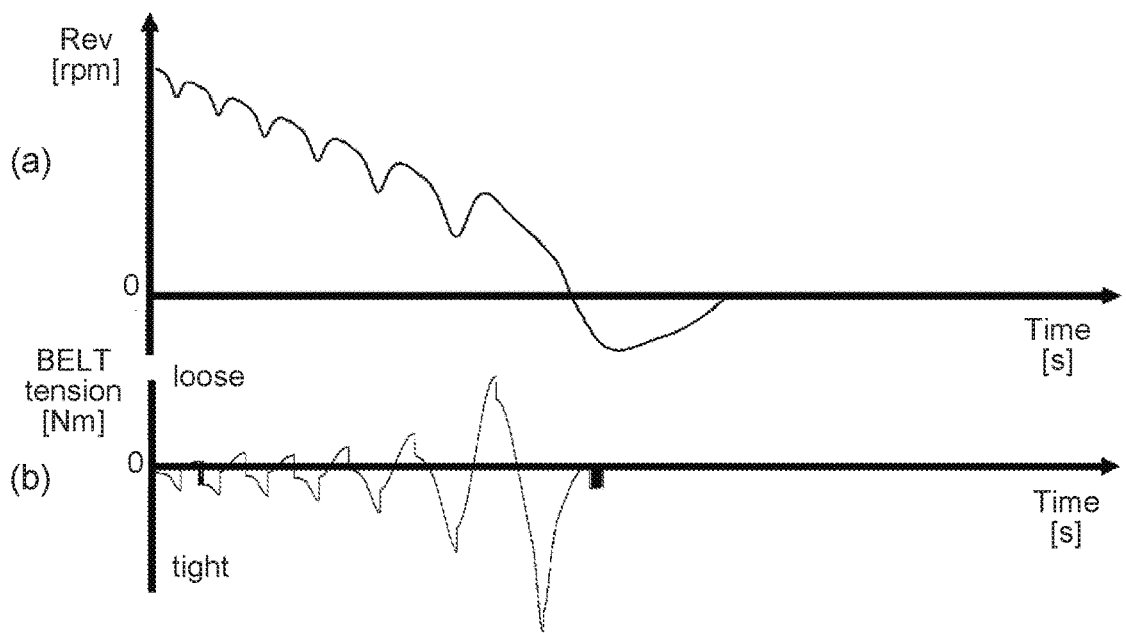
FIG. 3 is a characteristic diagram showing (a) the state of decrease in pulsating engine revolution speed and (b) periodic changes in belt tension in accordance with this for comparison.

Part (a) of FIG. 3 shows characteristics of revolution speed changes in the process of the engine revolution speed of the internal-combustion engine 1 decreasing with cutting of fuel to stop the vehicle on the assumption that the load on the starter generator 4 is constant (for example, in a state where neither powering nor regeneration is performed). As shown in the drawing, the engine revolution speed exhibits a decreasing trend as a whole; however, it involves pulsation that periodically changes up and down microscopically. In other words, the rotational acceleration periodically changes between positive and negative.

With this, the belt tension periodically changes so that the high-tension period in which the tension is relatively high and the low-tension period in which the tension is relatively low appear alternately as shown in part (b) of FIG. 3. The characteristics shown in this drawing are found by simulation of the original belt tension that does not include preliminary powering of the starter generator 4 and the impact of the tensioners 10.

Figure 2:
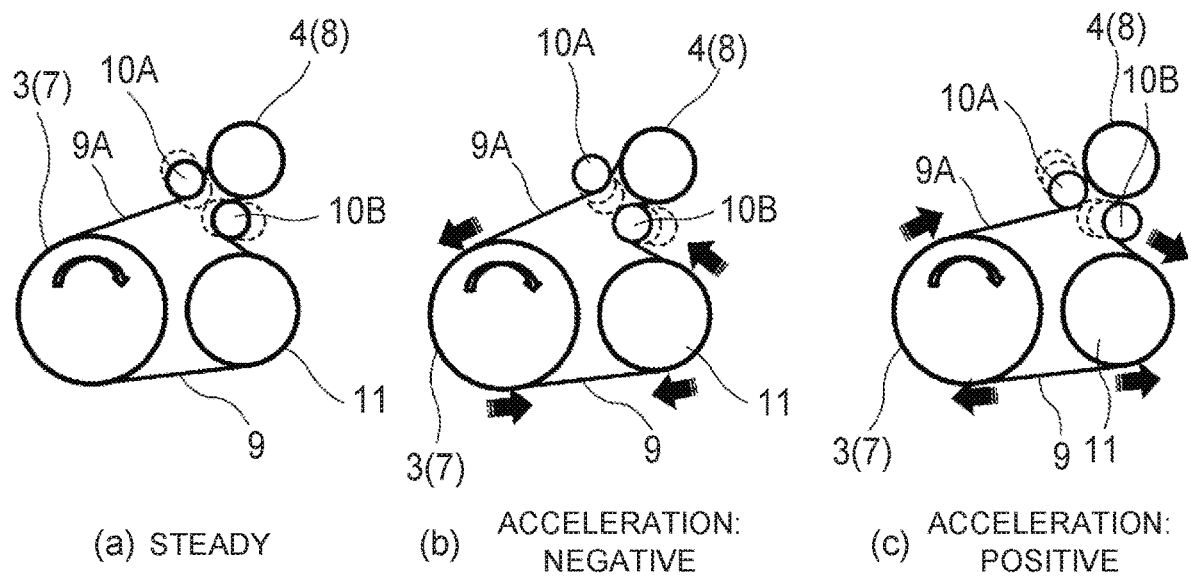
FIG. 2 is an explanatory diagram of the belt tension and the state of a tensioner in each of cases where the internal-combustion engine is (a) in a steady state, (b) during deceleration, and (c) during acceleration.

FIG. 2 is an explanatory diagram for explaining changes in the belt tension with variation in the engine revolution speed; on the assumption that the load on the starter generator 4 is constant, in a steady state in which the engine revolution speed is constant, as shown in part (a) of the drawing, the belt tension in the section 9A between the starter generator 4 and the upstream-side crankshaft pulley 7 goes into a certain steady state. At this time, the tensioner 10A located in the section 9A is in a predetermined position. That is, the tensioner 10A is displaced by a predetermined amount according to the belt tension.

When the internal-combustion engine 1 is decelerated from a state where the internal-combustion engine 1 is rotating in the steady state, i.e., when the rotational acceleration is negative, as shown in part (b) of the drawing, the belt tension in the section 9A is increased. The tensioner 10A located in the section 9A at this time is displaced to the outer circumferential side in response to the increase in the belt tension.

On the other hand, when the internal-combustion engine 1 is accelerated, i.e., when the rotational acceleration is positive, as shown in part (c) of the drawing, the belt tension in the section 9A is decreased. The tensioner 10A located in the section 9A at this time is displaced to the inner circumferential side in response to the decrease in the belt tension.

Therefore, the revolution speed of the internal-combustion engine 1 pulsates as shown in FIG. 3, and, as a result, the belt tension changes periodically. The section 9A of the belt 9 is a section on the downstream side of the crankshaft pulley 7 that rotates in the clockwise direction in FIG. 2; therefore, in a situation where the starter generator 4 rotates in accordance with the rotation of the internal-combustion engine 1, of the belt 9 wound around the crankshaft pulley 7 and the starter generator 4, the section 9A is basically the so-called loose side. However, the belt tension periodically changes up and down as shown in part (b) of FIG. 3, and, as a result, it may be said that from a microscopic perspective, slack in the section 9A of the belt 9 occurs only in the low-tension period, and sufficient belt tension prepared for restart originally exists in the high-tension period, and thus preliminary powering torque is not necessary.

In this way, in the above-described embodiment, preliminary powering is performed only in the low-tension period. Accordingly, it is possible to realize the economic application of preliminary powering torque that takes periodic changes in the belt tension into consideration.

Here, as the setting of preliminary powering torque applied in the low-tension period, for example, two forms may be considered.

One of the forms is the setting (this is referred to as a first embodiment) that allows the sum of powering torque (in other words, the sum of input energy) to be equal to that is in a case where preliminary powering torque is applied always including the high-tension period (this is referred to as a second comparative example). In this first embodiment, the preliminary powering torque applied in the low-tension period is naturally higher than that is in the second comparative example. For example, in the low-tension period, about two and a half times preliminary powering torque is applied.

The other form is the setting (this is referred to as a second embodiment) that allows powering torque in the low-tension period to be equal to that is in the second comparative example in which preliminary powering torque is applied always including the high-tension period. In this second embodiment, the sum of input energy is naturally lower than that is in the second comparative example.

These settings can be fittingly selected, for example, according to the specifications of the vehicle. Furthermore, the intermediate setting between the above-described two examples is also possible.

Figure 5:
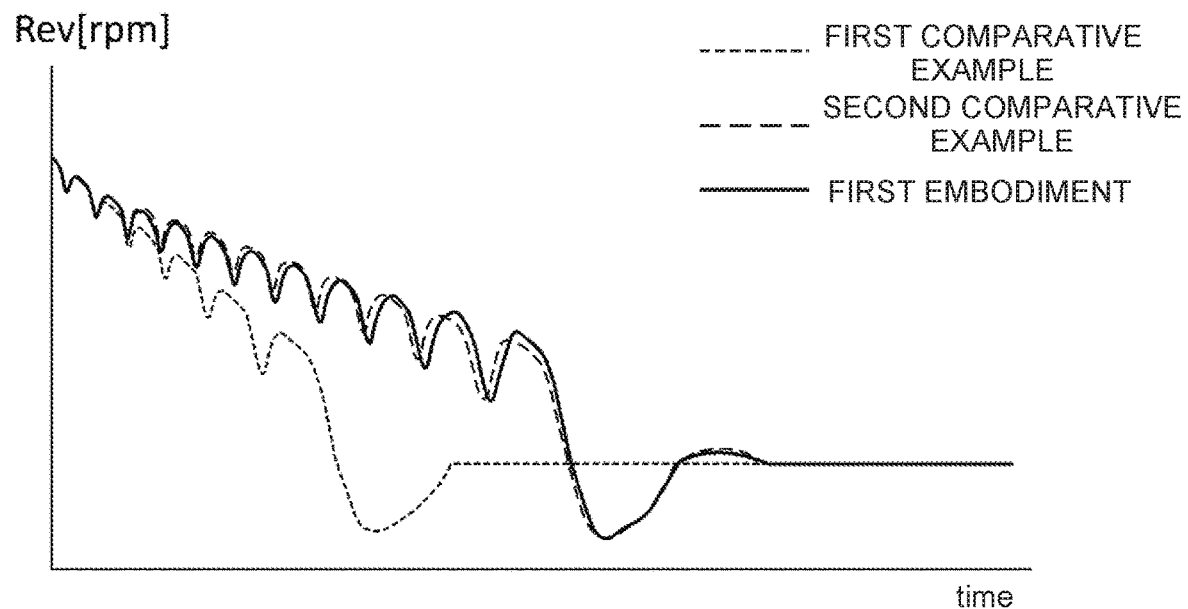
FIG. 5 is a characteristic diagram showing characteristics of the decrease in the engine revolution speed in a first embodiment.
Figure 6:
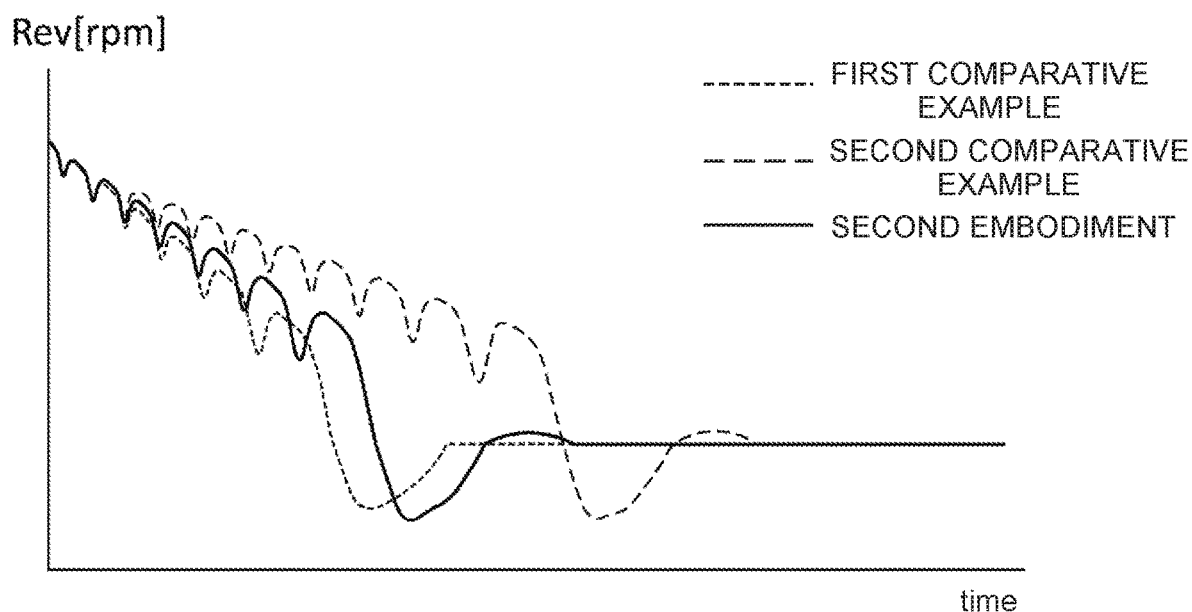
FIG. 6 is a characteristic diagram showing characteristics of the decrease in the engine revolution speed in a second embodiment.

FIGS. 5 and 6 are characteristic diagrams showing respective characteristics of decrease in the engine revolution speed in the first and second embodiments. These drawings show characteristics in a case where preliminary powering is not performed at all (this is referred to as a first comparative example), characteristics in the above-described second comparative example in which preliminary powering torque is applied continuously including the high-tension period, and respective characteristics in the embodiments for comparison.

As shown in the first comparative example, in the process of the engine revolution speed decreasing to stop the vehicle, the engine revolution speed decreases while pulsating. As shown in the second comparative example, when constant preliminary powering torque is continuously applied to remove slack in the belt 9, this preliminary powering torque assists the rotation of the internal-combustion engine 1, and thus the decrease in the revolution speed becomes slow, and time required to completely stop the rotation becomes longer. Therefore, the length of time the engine revolution speed remains at a resonance point (a frequency band at which a powertrain system of the vehicle resonates) that generally exists below an idling speed is increased, and noise and vibration characteristics become deteriorated.

On the other hand, in the second embodiment in which preliminary powering torque of the same magnitude as that is in the second comparative example is applied only in the low-tension period, as shown in FIG. 6, the decrease in the revolution speed is faster than that is in the second comparative example, and the length of time the engine revolution speed remains at the resonance point can be shortened, and thus deterioration in noise and vibration characteristics is little.

In a case of the first embodiment in which preliminary powering torque is high, as shown in FIG. 5, the decrease in the revolution speed is equal to that is in the second comparative example.

Figure 7:
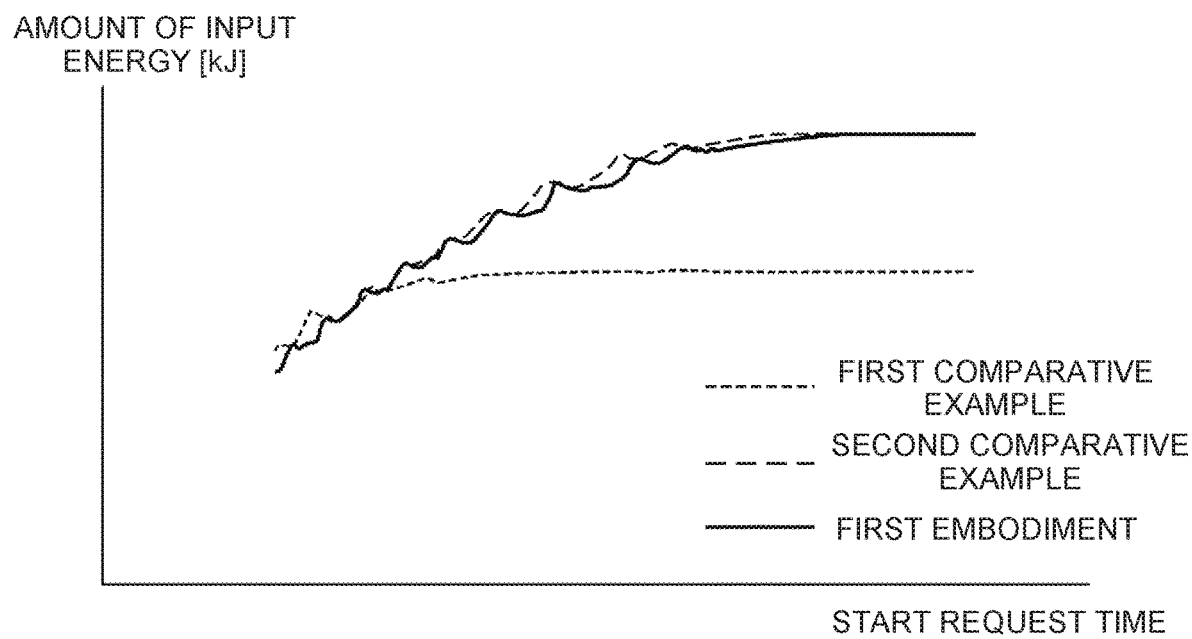
FIG. 7 is a characteristic diagram showing characteristics of the amount of input energy in the first embodiment.
Figure 8:
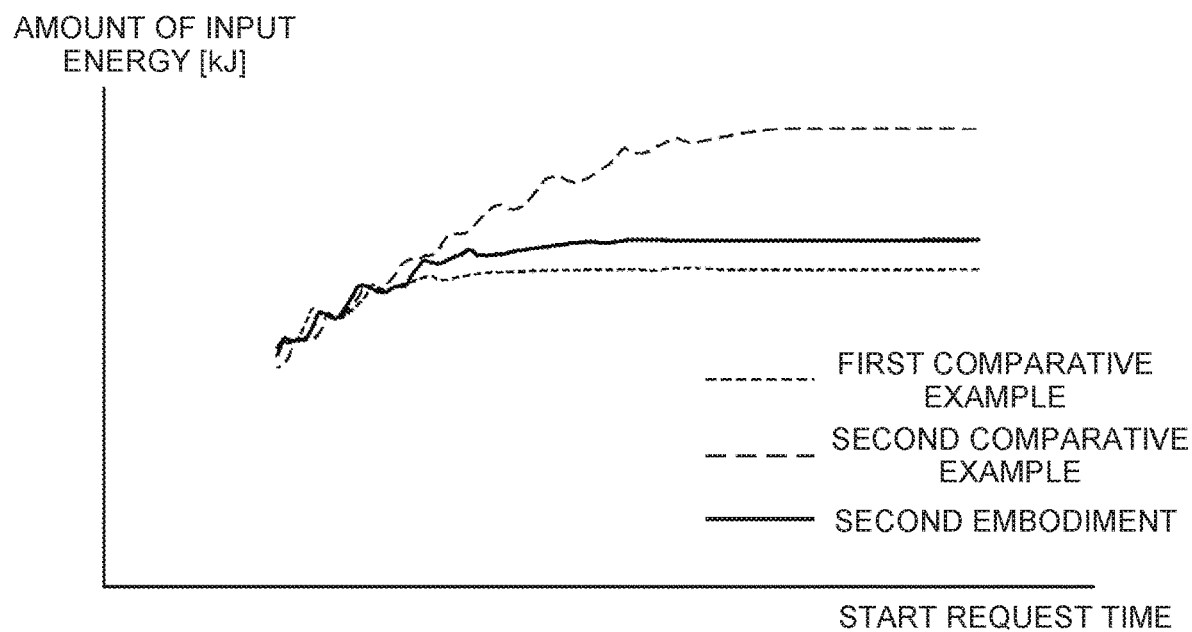
FIG. 8 is a characteristic diagram showing characteristics of the amount of input energy in the second embodiment.

FIGS. 7 and 8 are characteristic diagrams showing respective characteristics of the amount of input energy in the first and second embodiments. The horizontal axis indicates a start request time. That is, these drawings show input energy required until the completion of restart in a case where the restart is requested at certain timing.

As shown in FIG. 8, in the second embodiment in which preliminary powering torque of the same magnitude as that is in the second comparative example is applied only in the low-tension period, input energy can be drastically reduced as compared with the second comparative example.

In a case of the first embodiment in which preliminary powering torque is high, as shown in FIG. 7, input energy is approximately equal to that is in the second comparative example.

Figure 9:
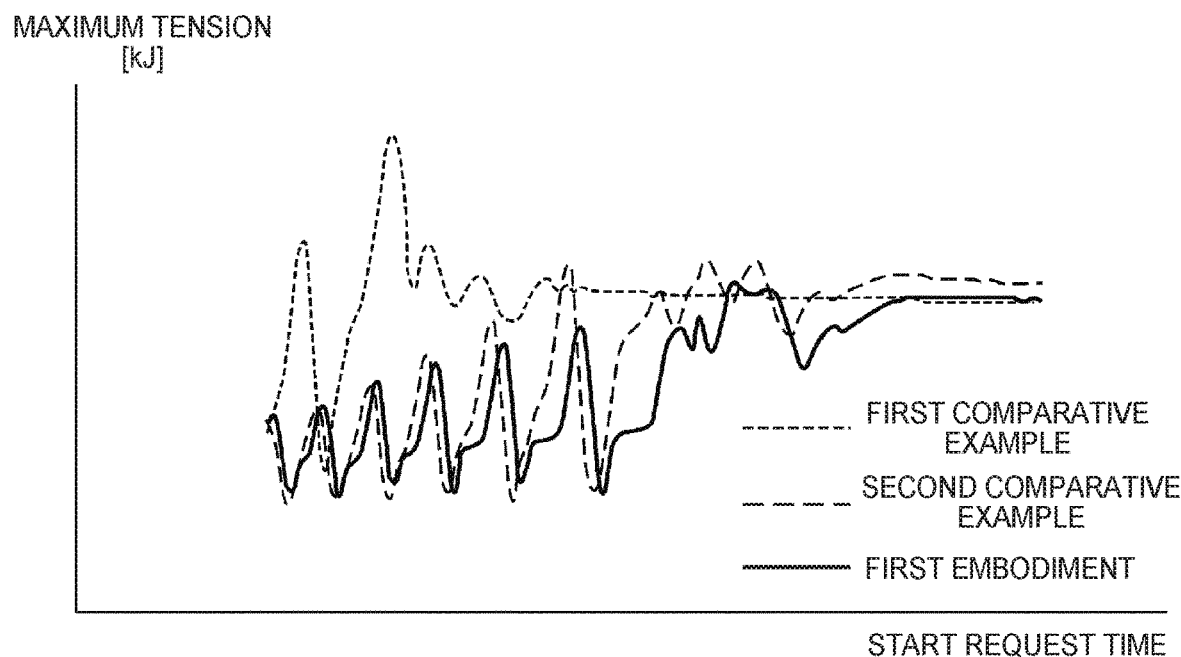
FIG. 9 is a characteristic diagram showing characteristics of the maximum tension in the first embodiment.
Figure 10:
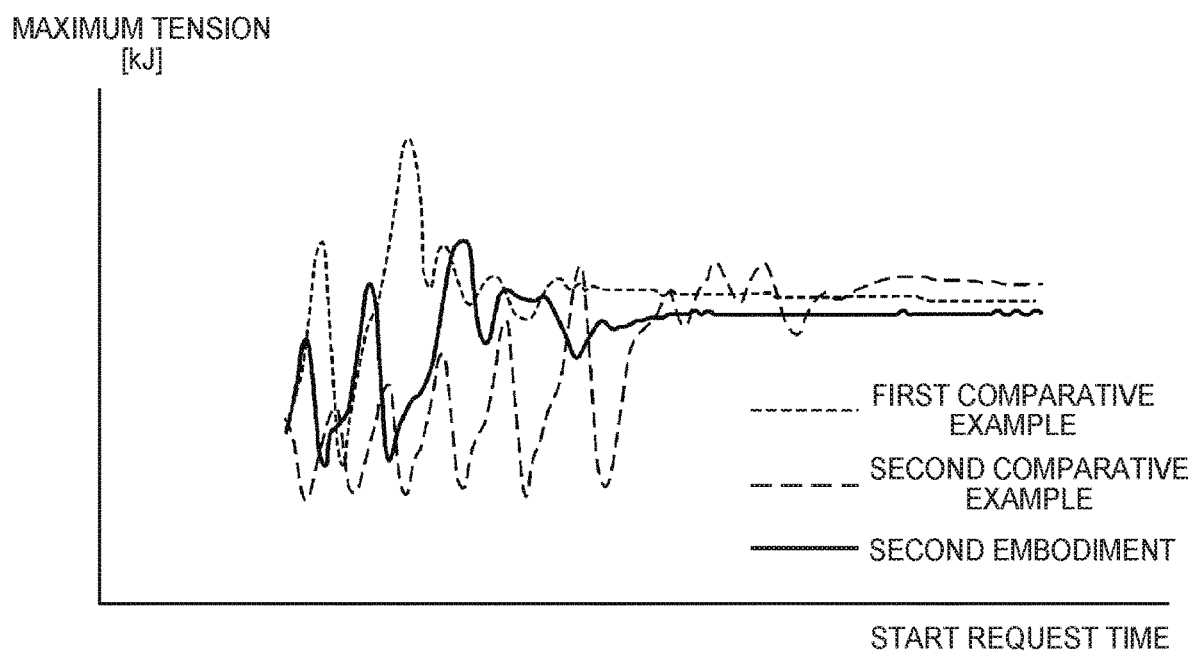
FIG. 10 is a characteristic diagram showing characteristics of the maximum tension in the second embodiment.

FIGS. 9 and 10 are characteristic diagrams showing respective characteristics of the maximum tension in the first and second embodiments. The horizontal axis indicates a start request time. That is, when restart is requested at a certain timing, and the starter generator 4 generates starting torque and cranks up the internal-combustion engine 1, after slack in the belt 9 becomes zero, the belt tension rapidly increases. Therefore, the maximum tension correlates with a slack of state in the belt 9 that occurs periodically (for example, see the first comparative example); however, the maximum tension becomes lower by the application of preliminary powering torque (for example, see the second comparative example).

As shown in FIG. 10, in the second embodiment in which preliminary powering torque of the same magnitude as that is in the second comparative example is applied only in the low-tension period, the maximum tension is reduced to the same level as the second comparative example.

On the other hand, in the first embodiment in which preliminary powering torque is high, as shown in FIG. 9, the maximum tension is further reduced to lower than the second comparative example.

Figure 11:
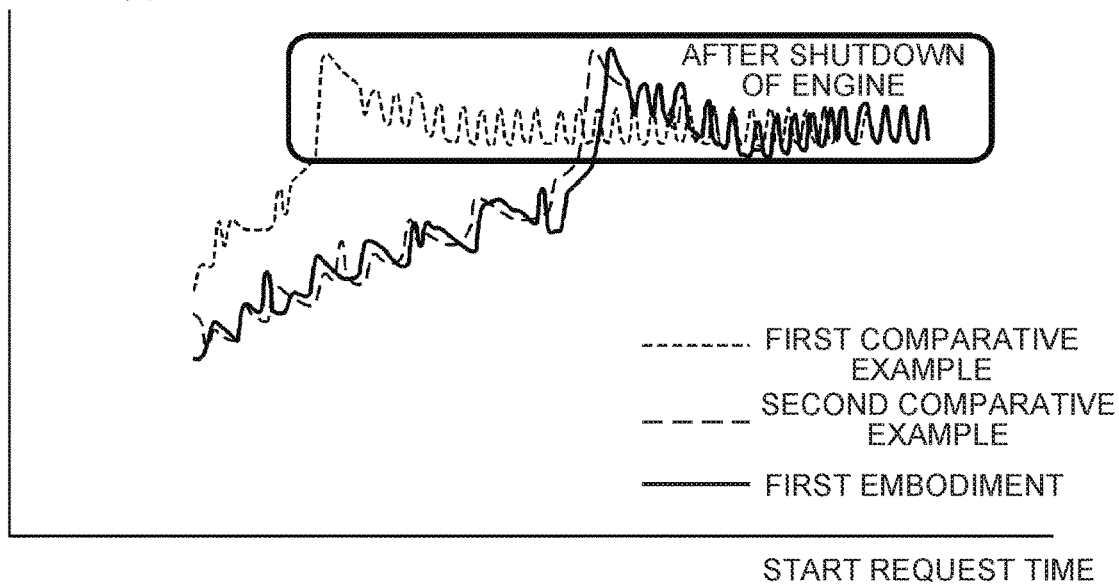
FIG. 11 is a characteristic diagram showing characteristics of time required to restart in the first embodiment.
Figure 12:
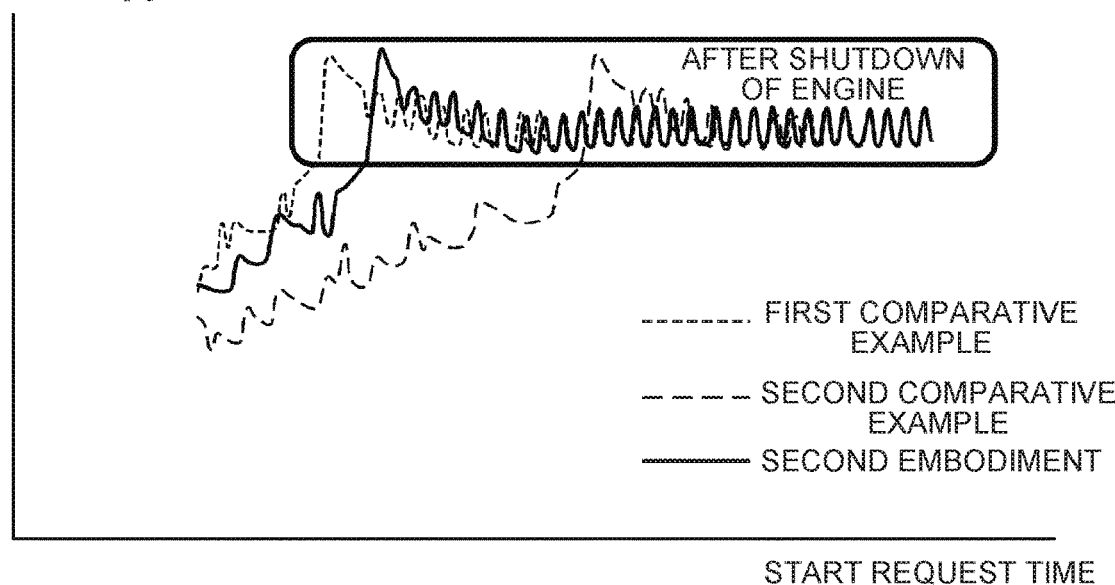
FIG. 12 is a characteristic diagram showing characteristics of time required to restart in the second embodiment.

FIGS. 11 and 12 are characteristic diagrams showing respective characteristics of time required to restart in the first and second embodiments. The horizontal axis indicates a start request time. That is, FIGS. 11 and 12 show how long it takes until the completion of restart when the restart is requested at certain timing. The rotation of the internal-combustion engine 1 is stopped at certain point of time, and thus, from that point onwards, the internal-combustion engine 1 is restarted from its rotation stop state. The timing for the internal-combustion engine 1 to stop rotating varies according to with or without preliminary powering torque and the magnitude of preliminary powering torque as described above; in the drawings, the point of time at which the required time reaches a peak in each characteristic roughly coincide with the timing for the internal-combustion engine 1 to stop rotating. It is to be noted that in either example, the restart responsiveness after the internal-combustion engine 1 has stopped rotating is basically no different.

As shown in FIG. 11, in the first embodiment, the restart responsiveness at the timing before the internal-combustion engine 1 has stopped rotating becomes higher than the first comparative example without preliminary powering. In particular, the start responsiveness approximately equal to that of the second comparative example is obtained.

In the second embodiment, as shown in FIG. 12, the decrease in the revolution speed is faster than that is in the second comparative example in which constant preliminary powering torque is continuously applied, and thus the restart responsiveness at the timing before the internal-combustion engine 1 has stopped rotating becomes slightly lower; however, the start responsiveness is higher than that is in the first comparative example without preliminary powering.

In this way, according to the setting of preliminary powering torque as in the first embodiment, there is an advantage in that the maximum tension can be reduced to lower than the second comparative example. According to the setting of preliminary powering torque as in the second embodiment, there are advantages in that the length of time the engine revolution speed remains at the resonance point can be shortened, and energy consumption can be suppressed as compared with the second comparative example.

Whether the belt tension is in the low-tension period in the process of the revolution speed of the internal-combustion engine 1 decreasing can be detected directly or indirectly by some means. Alternatively, without such detection, preliminary powering torque may be changed up and down on the basis of a crank angle, etc. so as to correspond to a known pulsation period.

As an example, whether the belt tension is in the low-tension period can be indirectly detected on the basis of the rotational acceleration of the crankshaft 3 detected by a crank angle sensor or the like.

Likewise, whether the belt tension is in the low-tension period can be detected on the basis of the rotational acceleration of the starter generator 4. The rotational acceleration of the starter generator 4 can be detected, for example, by a rotation sensor built into the starter generator 4.

As another example, whether the belt tension is in the low-tension period can be detected on the basis of displacement of the tensioner 10A located between the crankshaft 3 and the starter generator 4. As shown in part (c) of FIG. 2, when the belt tension is decreased, the tensioner 10A is displaced to the inner circumferential side; therefore, whether the belt tension is in the low-tension period can be detected from its amount of displacement.

Likewise, a force exerted on the tensioner 10A by a biasing mechanism including a spring, a hydraulic mechanism, etc. may be detected, and whether the belt tension is in the low-tension period can also be detected on the basis of the magnitude of this force.

As still another example, whether the belt tension is in the low-tension period can be indirectly detected on the basis of shaft torque of the crankshaft 3.

Likewise, whether the belt tension is in the low-tension period can be indirectly detected on the basis of shaft torque of the starter generator 4.

It is to be noted that in the above embodiments, there is described an example where preliminary powering torque is not applied in the high-tension period; however, it may be configured that lower preliminary powering torque than the preliminary powering torque in the low-tension period is applied in the high-tension period.

The invention claimed is:

1. A restart standby control method for an internal-combustion engine including a motor generator that is connected with a crankshaft through a belt transmission mechanism and applies a starting torque through a powering operation, the restart standby control method comprising:
    performing a preliminary powering in which the motor generator applies a preliminary powering torque on the belt transmission mechanism, thereby suppressing a slack in a belt between the crankshaft and the motor generator in preparation for a restart of the internal-combustion engine when an engine revolution speed decreases with cutting of fuel to the internal-combustion engine to stop a vehicle; and
    while a belt tension periodically changes between a high-tension period in which the slack does not occur and a low-tension period in which the slack occurs, controlling the preliminary powering to cause the preliminary powering torque in the low-tension period to be higher than the preliminary powering torque in the high-tension period,
    wherein the preliminary powering is performed only in the low-tension period, and no preliminary powering torque is applied in the high-tension period, and
    wherein the preliminary powering torque in the low-tension period is set to be higher to cause a sum of an input energy to be equal to that is in a case where a constant preliminary powering torque is applied continuously in both the low-tension period and the high-tension period.

2. The restart standby control method for the internal-combustion engine according to claim 1, further comprising executing a detection as to whether the belt tension is in the low-tension period directly or indirectly.

3. The restart standby control method for the internal-combustion engine according to claim 2, wherein the detection is executed on a basis of a rotational acceleration of the crankshaft.

4. The restart standby control method for the internal-combustion engine according to claim 2, wherein the detection is executed on a basis of a rotational acceleration of the motor generator.

5. The restart standby control method for the internal-combustion engine according to claim 2, wherein the detection is executed on a basis of a displacement of a tensioner disposed between the crankshaft and the motor generator.

6. The restart standby control method for the internal-combustion engine according to claim 2, wherein the detection is executed on a basis of a force exerted on a tensioner disposed between the crankshaft and the motor generator.

7. The restart standby control method for the internal-combustion engine according to claim 2, wherein the detection is executed on a basis of a shaft torque of the crankshaft.

8. The restart standby control method for the internal-combustion engine according to claim 2, wherein the detection is executed on a basis of a shaft torque of the motor generator.

9. A restart standby control device for an internal-combustion engine comprising a motor generator that is connected with a crankshaft of the internal-combustion engine through a belt transmission mechanism, and applies a starting torque through a powering operation, the device comprising:
    a controller programmed to:
        perform a preliminary powering in which the motor generator applies a preliminary powering torque on the belt transmission mechanism, thereby suppressing a slack in a belt between the crankshaft and the motor generator in preparation for a restart of the internal-combustion engine when an engine revolution speed decreases with cutting of fuel to the internal-combustion engine to stop a vehicle, and
        while a belt tension periodically changes between a high-tension period in which the slack does not occur and a low-tension period in which the slack occurs, control this preliminary powering to cause the preliminary powering torque in the low-tension period to be higher than the preliminary powering torque in the high-tension period,
    wherein the controller is further programmed to perform the preliminary powering only in the low-tension period and apply no preliminary powering torque in the high-tension period, and
    wherein the preliminary powering torque in the low-tension period is set to be higher to cause a sum of an input energy to be equal to that is in a case where a constant preliminary powering torque is applied continuously in both the low-tension period and the high-tension period.

* * * * *